J. F. MIRRIELEES.
FEED MECHANISM FOR DRILLING MACHINES.
APPLICATION FILED JUNE 6, 1919.

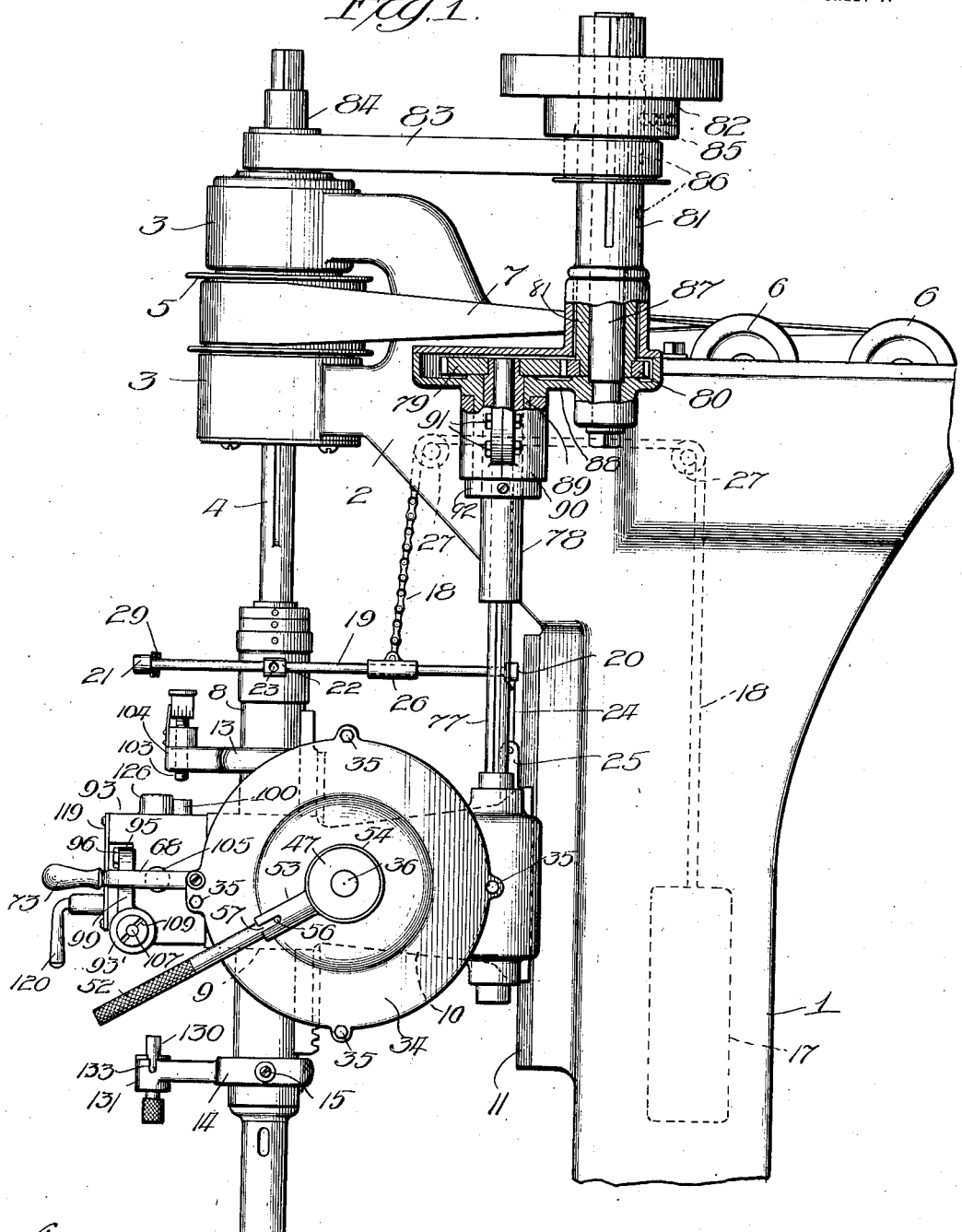

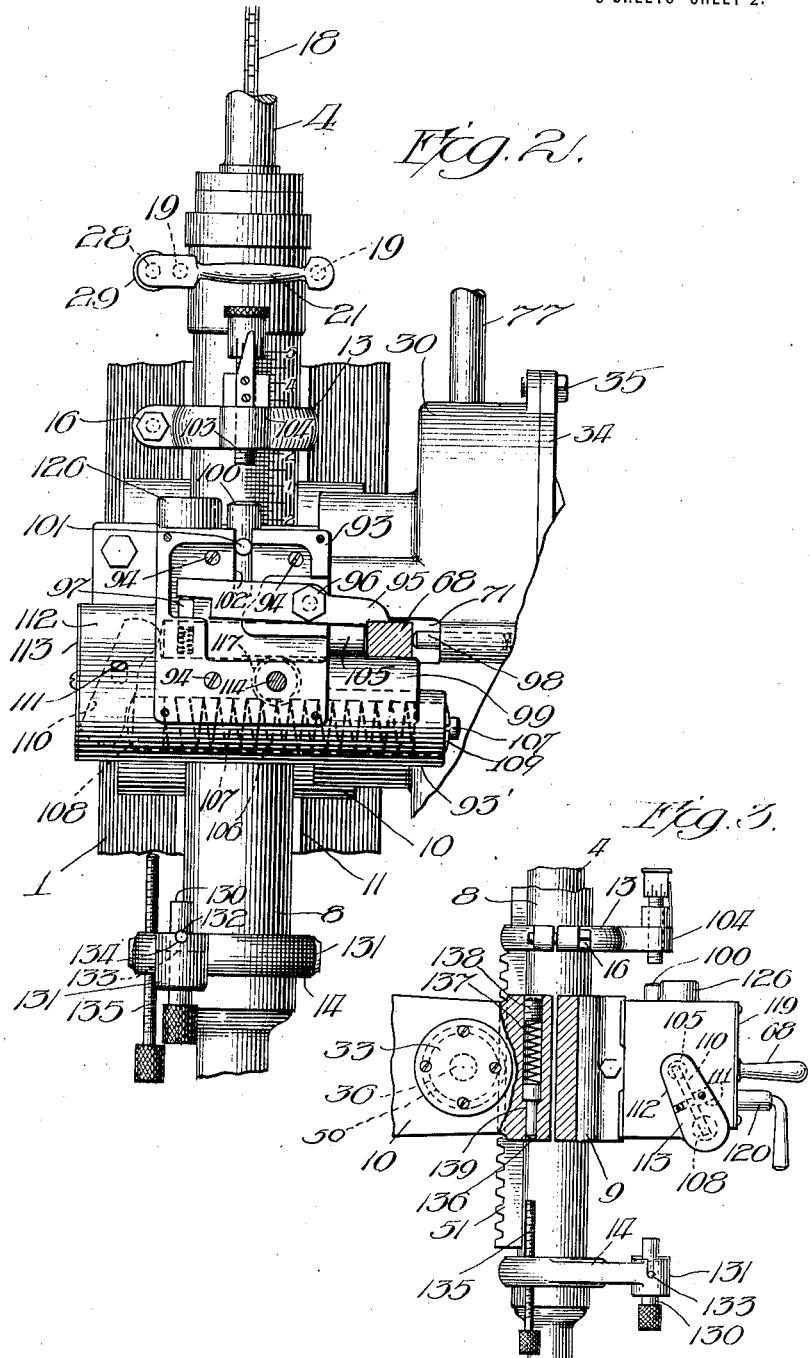

1,388,875.

Patented Aug. 30, 1921.

5 SHEETS—SHEET 3.

Witness:
Harry S. Gaither

Inventor:
James F. Mirrielees
by Peirce, Fisher & Clapp
Attys

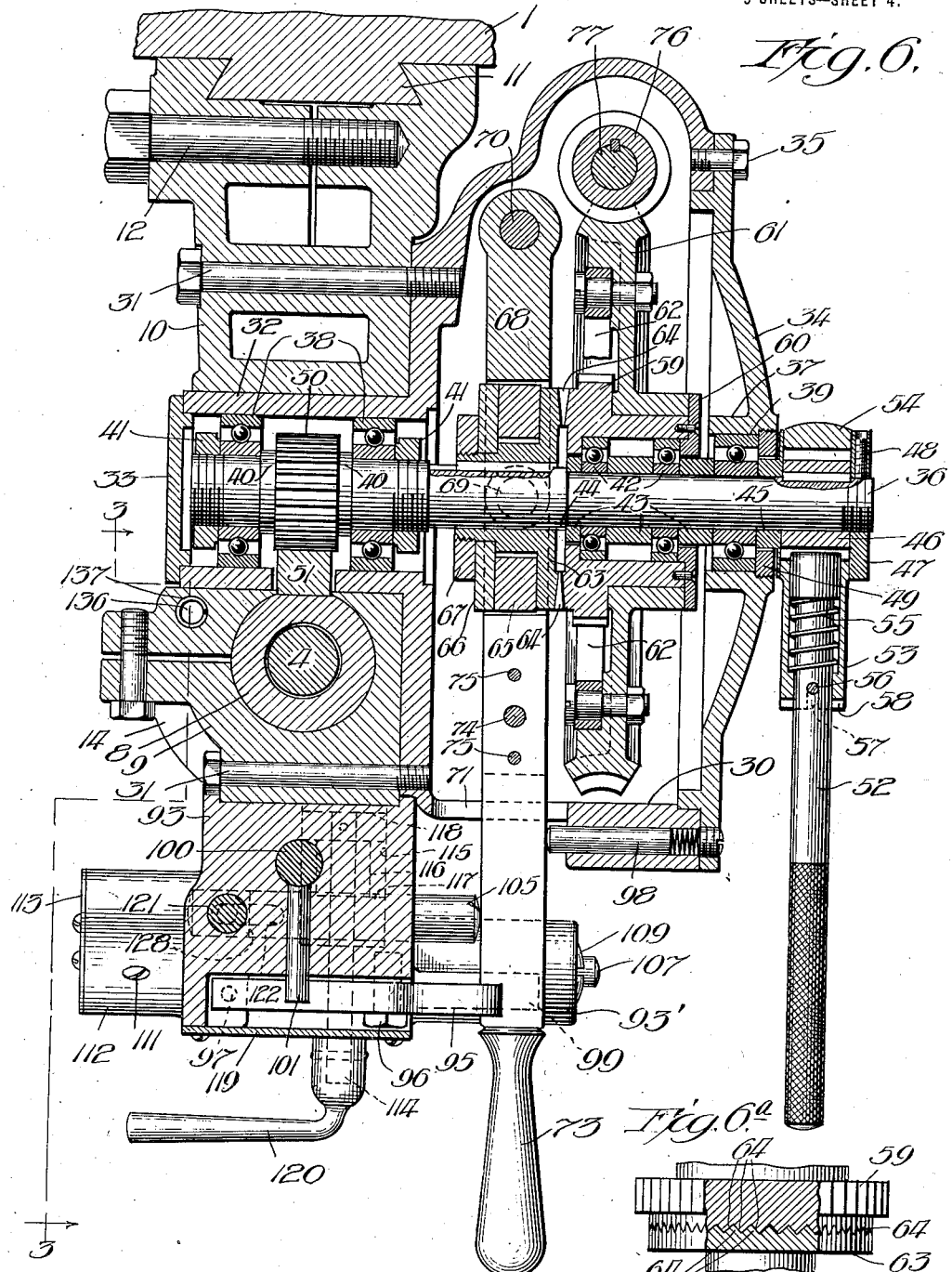

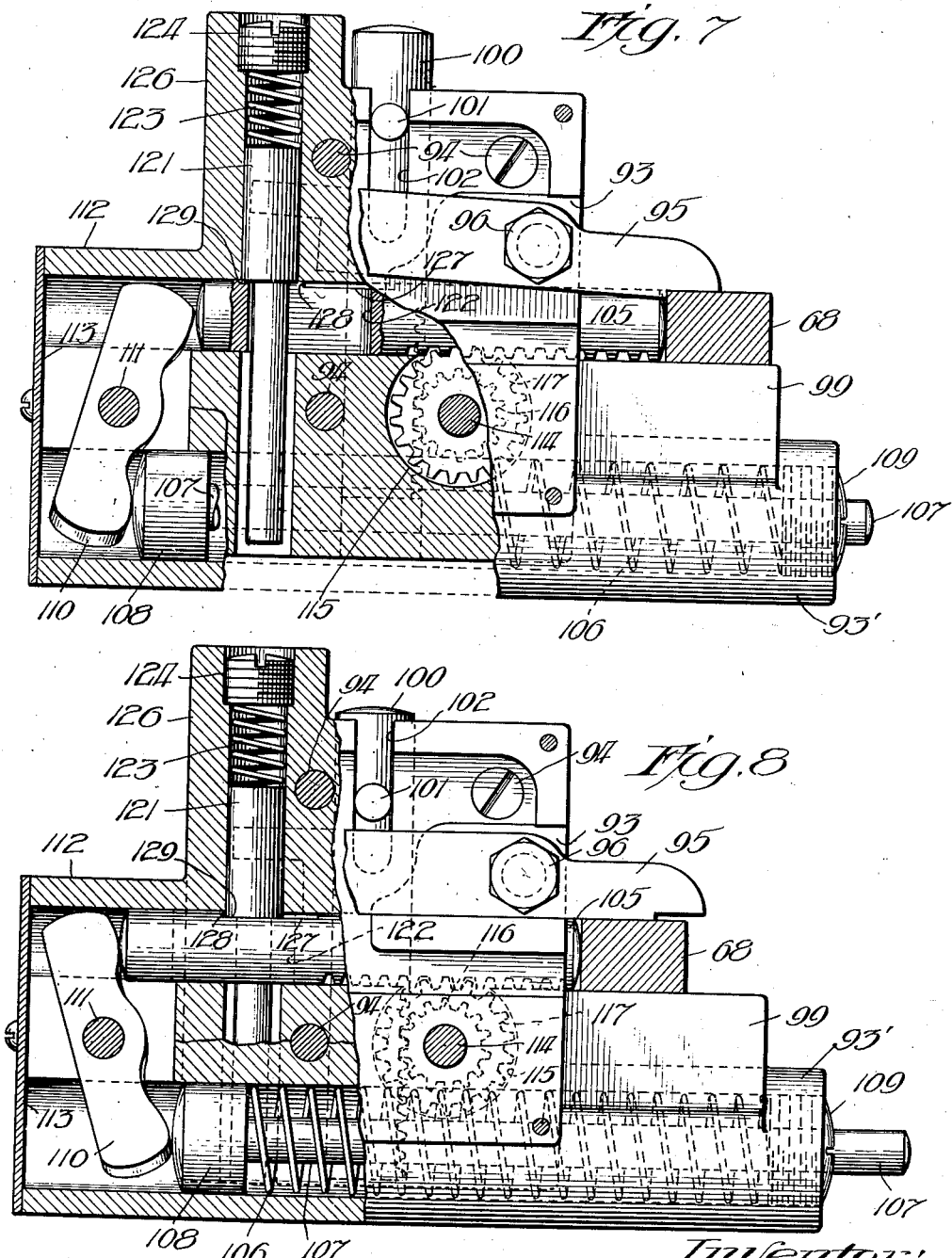

UNITED STATES PATENT OFFICE.

JAMES F. MIRRIELEES, OF CINCINNATI, OHIO, ASSIGNOR, BY MESNE ASSIGNMENTS, TO THE AVEY DRILLING MACHINE COMPANY, OF CINCINNATI, OHIO, A CORPORATION OF OHIO.

FEED MECHANISM FOR DRILLING-MACHINES.

1,388,875.

Specification of Letters Patent. Patented Aug. 30, 1921.

Application filed June 6, 1919. Serial No. 302,166.

*To all whom it may concern:*

Be it known that I, JAMES F. MIRRIELEES, a citizen of the United States, and a resident of Cincinnati, county of Hamilton, and State of Ohio, have invented certain new and useful Improvements in Feed Mechanism for Drilling-Machines, of which the following is a specification.

The invention seeks to provide an improved feed mechanism for drilling machines which can be operated automatically in whole or in part, or by hand, and which in any event is at all times under the operator's control, and also seeks to provide an improved trip mechanism for automatically arresting and reversing the movement of the drill spindle at the end of its working and return strokes, and which trip mechanism is certain and reliable in operation.

With these and other objects in view, the invention consists in the features of improvement hereinafter set forth, illustrated in the preferred form in the accompanying drawings, and more particularly pointed out in the appended claims.

Figure 4:
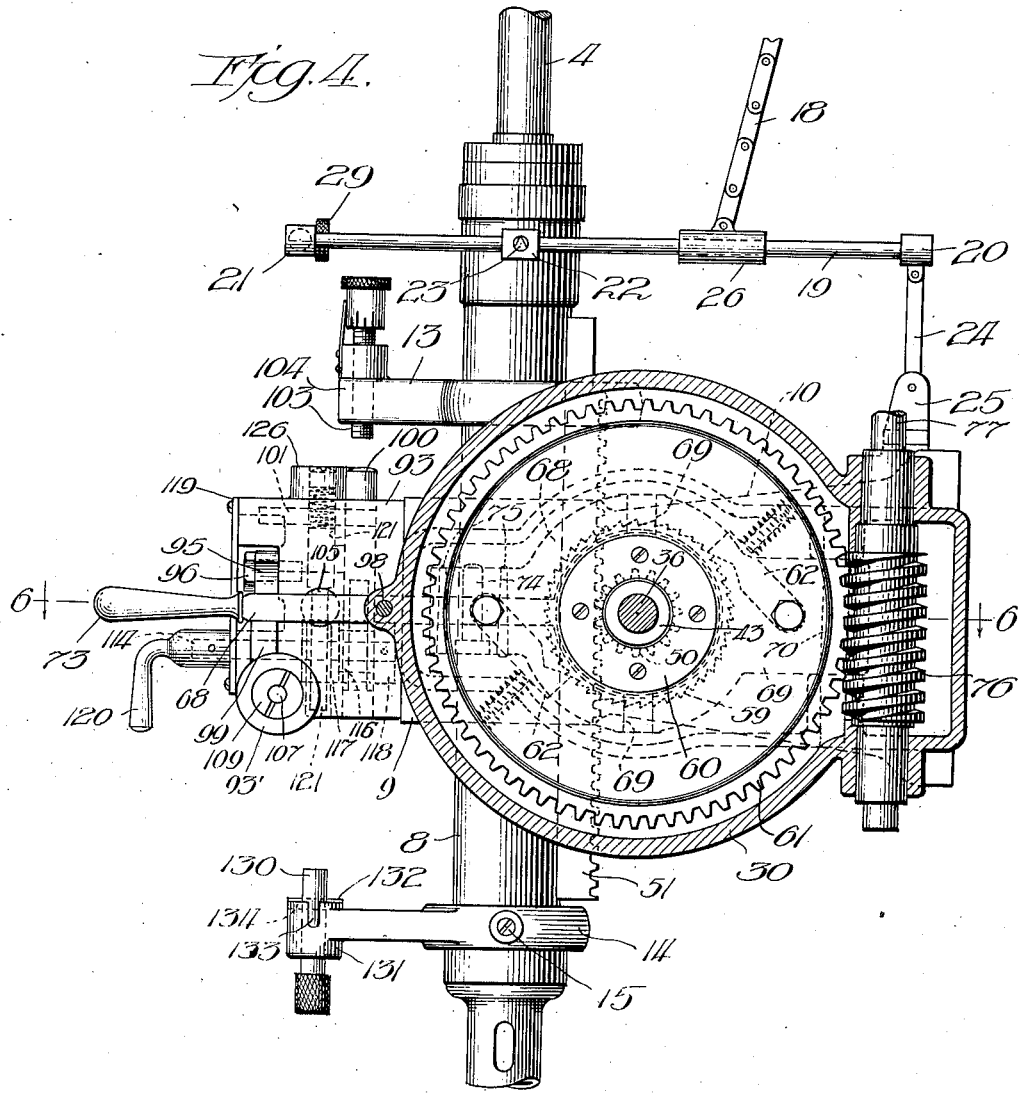
Figure 5:
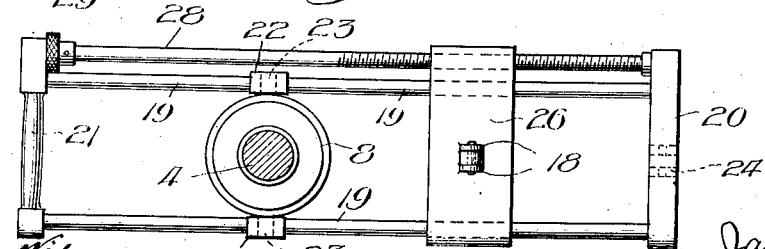

In the drawings: Figure 1 is a side elevation of a drilling machine with the present improved feed mechanism applied thereto; Fig. 2 is a partial front elevation with the cover of the trip mechanism support or box removed; Fig. 3 is a detail view in elevation with parts shown in section on the line 3—3 of Fig. 6; Fig. 4 is a partial side elevation on an enlarged scale with the gear casing shown in section; Fig. 5 is a plan detail view of the arm or lever to which the counter-balance for the spindle and spindle sleeve is connected; Fig. 6 is an enlarged horizontal section on the line 6—6 of Fig. 4; Fig. 6ª is a detail view showing the engaging faces of the ratchet and clutch members; Figs. 7 and 8 are enlarged detail views of the trip mechanism with parts shown in different positions and portions of the box or support therefor broken away and shown in section.

The frame of the machine is of usual construction and comprises a vertical, hollow standard 1, the upper portion only of which is shown. A forwardly projecting head 2 on the upper end of the standard is provided with bearings 3 for the vertical drill spindle 4, a pulley 5 being mounted on the spindle between the bearings. The upper rear portion of the standard 1 carries two idler pulleys 6 which guide a drive belt 7, the latter serving to connect the pulley 5 of the drill spindle to a suitable driving counter-shaft (not shown).

The pulley 5 is keyed to the spindle 4, but the latter, as usual, is free to shift vertically through the pulley and through the bearings 3. The spindle is provided, as usual, with a supporting sleeve 8 which is connected to shift vertically therewith, but is held against rotary movement within a bearing 9 upon the outer end of a guiding head 10. The latter is vertically adjustable on a guide 11 at the front of the standard 1 and is held in adjusted position by a clamp screw 12. The sleeve is provided with upper and lower stop collars 13 and 14. The lower stop collar is held in place by a set screw 15 (see Figs. 1 and 4), while the upper stop collar is split and is held in adjusted position on the sleeve by a bolt 16 (see Fig. 3) extending through the ends thereof.

A counter-balance for the drill spindle and its supporting sleeve comprises a weight 17 which is connected by a chain 18 to an arm or lever that extends between the upper end of the sleeve and the inner portion of the guiding head. The arm or lever is preferably in the form of a rectangular frame (see Fig. 5) comprising side members 19 and inner and outer end members 20 and 21. Blocks 22 on the side members engage pivots 23 on the upper portion of the sleeve 8 and the inner end member 20 is connected by a link 24 to an upwardly projecting lug 25 on the inner portion of the guiding head 10. A slide or carriage 26 is mounted on the inner portions of the side members 19 and the end of the chain 18 is connected to a lug thereon and passes thence upwardly over two guide pulleys 27 within the upper portion of the standard 1 and thence downwardly to the weight 17. One end of the slide is provided with a threaded opening engaging a screw 28 which is journaled in the end members 20 and 21 and is provided at its forward end with a turn-button 29. By this means the position of the slide 26 can be readily shifted or adjusted to thereby vary the counter-balancing effect of the weight 17 upon the spindle and spindle sleeve. In this way the counter-balancing effect of the weight can be adjusted in accordance with the weights of different tools carried by the drill spindle and also so that the weight will serve to effect the return movement of the drill spindle and sleeve when the automatic feed mechanism is employed for effecting the forward or working stroke thereof.

The feed shaft for the spindle and the drive gearing therefor are arranged within a casing 30 mounted on the guiding head. As most clearly shown in Fig. 6, the inner portion of the casing is adapted to fit against one of the side faces of the guiding head and is secured thereto by bolts 31. Preferably, the inner portion of the casing is provided with a sleeve-like part 32 which extends through an opening in the guiding-head and is provided at its end with a small cap plate 33. The outer portion of the casing is provided with a large cover plate 34 which is secured to the main body thereof by a series of bolts 35.

A horizontal feed shaft 36 is arranged within the casing and is journaled at its ends in the sleeve 32 and a sleeve-like flange 37 on the cover 34, the inner end of the shaft being preferably carried by two ball-bearings 38, and the outer end of the shaft by a ball-bearing 39. Shoulders 40 on the shaft and collars 41 threaded thereon engage the inner members of the ball-bearings 38 and hold the latter in place. The bearing 39 and two other ball-bearings 42, together with a series of spacing collars 43, are held in place on the shaft between a shoulder 44 thereof and a flanged collar 45. The latter is held in place by a sleeve 46 on the shaft and a disk or washer 47 threaded on the outer end of the shaft and fixed thereto by a set-screw 48. The ball-bearing 39 is also held in place by a washer 49 threaded in an opening in the cover 34 and engaging the outer member of the bearing. A pinion 50, mounted on the inner portion of the feed-shaft 36 between the bearings 38, engages a rack 51 fixed to the inner side portion of the spindle-sleeve 8.

A handle 52 is provided for manually operating the feed shaft 36. The inner end of this handle extends through a socket or sleeve 53 on a hub 54, the latter being mounted upon the sleeve 46 between the flanged collar 45 and the disk or washer 47. The sleeve 46 is keyed to the shaft and its periphery is provided with a series of notches which are arranged to receive the inner end of the handle 52 to lock the handle to the shaft and enable it to rotate the shaft. A spring 55 arranged within the socket 53 and coiled about the inner end of the handle engages shoulders on these parts and tends to force the handle inwardly into engagement with one of the notches of the sleeve 46. A cross-pin 56 extending through the handle is arranged to engage either deep notches 57, or shallow notches 58 formed in the outer end of the sleeve 53. When it engages the deep notches, as shown in Fig. 6, the handle is locked to the feed shaft, but by moving the handle outwardly against the tension of the spring 55 it can be rotated to engage the pin 56 with the shallow notches 58 to thereby disengage the handle from the feed-shaft.

A ratchet wheel 59 is mounted upon the ball-bearings 42, being held in place thereon by an integral flange overlapping the outer member of one of the bearings, and a plate 60 secured to its hub and overlapping the outer member of the other bearing. A worm-wheel 61 is loosely mounted upon the hub of the ratchet and is held in place thereon by the plate 60. Pawls 62 pivoted on the worm-wheel are spring-pressed into engagement with the ratchet to thereby form a one-way connection between the worm and ratchet wheels, and through which the ratchet is driven in proper direction to effect the downward or working stroke of the drill spindle. The ratchet is connected to the feed shaft 36 to effect the working stroke of the spindle by means of a clutch member 63, the adjacent faces of the ratchet and clutch member having coöperating teeth 64. The clutch member is keyed to the shaft but is axially shiftable thereon to engage and disengage the clutch teeth 64. The engaging faces of the ratchet and clutch member are preferably provided with a large number of teeth 64 arranged closely adjacent each other so that these parts can be engaged in a large number of different relative positions, a slight angular distance apart, and the teeth are preferably beveled, as indicated in Fig. 6ª, so that they may be readily engaged and disengaged. A ring 65 is held in place upon the hub of the clutch member by a plate or washer 66 and a nut 67 and is surrounded by the looped portion of a shift lever 68 to which it is connected by pins 69. The shift lever is connected at its rear end to the gear casing by a vertical pivot bolt 70, and the portion of the shift lever in front of the clutch member projects through an opening 71 in the gear casing, its extreme forward end being provided with an operating handle 73 located in front of the drill spindle within easy reach of the operator. In the form shown, the shift lever 68 is formed of two sections, an inner cast section and an outer strap section, which are connected by a bolt 74 and key 75.

A worm wheel 61 is engaged by a worm 76 arranged within the rear portion of the gear casing and keyed on the lower end of a vertical counter-shaft 77 which is journaled in the casing. The counter-shaft 77 and the parts driven thereby are vertically adjustable with the guiding head 10 and the counter-shaft extends within and is keyed to a hollow shaft 78 having a gear 79 on its upper end. The gear 79 meshes with a gear 80 on the lower end of a sleeve 81 and the latter carries a stepped pulley 82 which is connected by a belt 83 to a stepped pulley 84 which engages and is driven by the upper end of the drill spindle 4. Pulley 84 is held against vertical movement and is preferably provided with two steps. Pulley 82 is preferably provided with three steps and is vertically adjustable on the sleeve 81 so that any one of the steps thereon can be brought into line with any one of the steps on the pulley 84 and connected thereto by the belt 83, thus driving the counter-shaft and feed mechanism for the drill spindle at any one of six different speeds relatively to the speed of rotation of the spindle. Pulley 82 is keyed to the sleeve 81 and is held in adjusted position thereon by a spring-actuated pin 85 carried thereby and arranged to engage any one of a number of seats 86 in the sleeve. The sleeve 81, having the gear 80 and stepped pulley 82 thereon, is rotatably mounted upon a vertical shaft or journal 87 which is fixed to the end of a swinging arm or bracket 88. The latter is preferably in the form of a casing for inclosing the gears 79 and 80, and at its inner end it is provided with a depending sleeve 89 surrounding the hollow shaft 78 and arranged within a supporting bracket 90 on the side of the frame arm or head 2. The outer portion of bracket 90 is split and the sections thereof are connected by bolts 91. By loosening the bolts, the arm 88 and the stepped pulley 82 carried thereby can be swung about the upper end of a hollow shaft or sleeve 78 and thus adjust it to place the belt 83 under proper tension when it passes over different steps of the pulleys 82 and 84. A collar 92 on the sleeve 78 engages the lower portion of the bracket 90 and holds the parts in position. By the means described, the counter-shaft, worm and worm-wheel are continuously driven when the machine is in operation.

By the means described, the counter shaft 77 is continuously driven when the machine is in operation. The counter-shaft, as stated, is vertically adjustable with the guiding head 10. The counter-shaft also, through the medium of the worm 76, continuously drives the worm-wheel 61, and the latter, through the pawls 62, operates the ratchet wheel 59 in proper direction to effect the forward or working stroke of the drill spindle. Feed shaft 36 and gear 50 are connected to the ratchet wheel to effect the forward or working stroke by means of the clutch member 63 which is under control of the shift lever 68. If desired, the connection of the counter-balancing weight 17 can be adjusted, as described, to effect the return movement of the drill spindle when the clutch is disengaged. The feed and return movement of the drill spindle can also be effected by the handle 52 which, in the manner stated, can be disengaged from the feed shaft when the power feed mechanism is used.

Means are also provided for automatically controlling the operation of the clutch and this automatic trip mechanism is mounted in a box-like, cast metal support 93 which is mounted upon the outer end of the head 10 and is connected thereto by a series of bolts 94. A latch 95 is arranged within a recess in the outer portion of the support 93 and is pivotally mounted on a bolt 96, its inner end being engaged by a spring-pressed pin 97 arranged within a suitable seat in the support 93. This latch projects from the box-like support 93 and is provided with a shouldered outer end which is arranged to engage the outer end of the clutch lever 68 and hold the clutch member in engaged position against the tension of a spring-pressed pin 98 which is mounted on the front portion of the gear casing and tends to move the lever 68 and clutch member 63 to disengaged position. To hold the outer end of the lever in proper relation to the latch 95, the outer end of the lever rests upon a guide lug 99 formed upon the support 93. A plunger 100 is vertically movable through a guide opening in the support 93 and a pin 101 projects forwardly therefrom and is movable through a vertical guide slot 102 in the support. When the plunger 100 is depressed, pin 101 is adapted to engage and release the latch 95. This release of the latch can be automatically effected, when desired, by a trip pin 103 which is adjustably threaded through a lug 104 on the upper stop collar 13, and is adapted to engage and depress the plunger 100 at the end of the working stroke of the spindle and spindle sleeve. This trip can be adjusted to vary the length of the working stroke, the adjustment being effected by varying the position of the stop collar 13 on the sleeve 8, and by adjusting the pin through the collar. Scales are preferably provided, as indicated in Fig. 2, so that this adjustment can be made with accuracy.

Means are also provided for automatically engaging the clutch at the beginning of the working stroke through the medium of a shifting member or plunger 105 which extends through a horizontal guide opening in the support or block 93 in front of the vertically movable plunger 100. This plunger or shifter is spring-actuated and its outer end is arranged to engage the clutch shifter 48. The actuating spring 106 for the plunger is coiled about a plunger rod 107 and these parts are arranged within a horizontal cylinder opening arranged within the lower front portion of the supporting block 93 and in a boss 93' thereon. The plunger rod 107 is provided with a head 108 at one end guided in such opening and its opposite end is guided in a collar 109 threaded into the opposite end of the opening. The spring 106 extends between the collar 109 and head 108 and forces the latter against the lower end of the lever 110 which is mounted between its ends upon a pivot screw 111 and which is arranged in an inclined position so that its upper end engages the adjacent end of the shift plunger 105. As shown, the lever 110 is arranged within a chambered boss 112 upon the side of the supporting block 93, such chamber being normally closed by a cover plate 113.

A horizontal shaft 114 is journaled in and extends from front to rear through the supporting block 93 below the horizontal shifter or plunger 105 and on one side of the vertically movable plunger 100. The rear portion of this shaft is arranged within a cylindrical chamber 115 in the supporting block 93 and carries two pinions 116 and 117 which are fixed to the shaft and to each other (being preferably formed in one piece) and which are respectively arranged to engage rack teeth formed upon the plungers 100 and 105. A collar 118 fixed to the rear end of the shaft has a bearing upon the peripheral wall of the cylindrical chamber 115. The recessed front face of the supporting block 93 is provided with a cover plate 119 and the shaft 114 extends through this cover plate and is provided with an external handle 120. As the plunger 100 is depressed, the pinions 116 and 117 and the shaft 114 are rotated to move the shifting plunger 105 toward the left, or from the position shown in Figs. 6 and 7 to that shown in Fig. 8. This movement of the plunger oscillates the lever 110 and shifts the plunger head 108 to compress the actuating spring 106. Plunger 105 is adapted to be held in retracted position with the spring compressed by a latch pin 121 arranged within a vertical guide opening in the supporting block 93 and having a reduced lower portion which extends through a slot 122 formed in and extending longitudinally of the shifting plunger 105. A spring 123 arranged in the guide opening for the latch pin engages its upper end and is held in position by a plug 124 threaded into a hollow boss 126 formed upon the supporting block 93. This spring tends to force the latch pin downwardly and holds its enlarged upper portion in engagement with the upper face of the shifting plunger 105. The upper face of the latter is provided with a recess 127 forming a shoulder 128. When the plunger is retracted, this shoulder passes beyond the latch pin 121 so that the shoulder 129 of the latter drops into the recess 127 and engages the shoulder 128 to hold the plunger retracted and the spring 106 compressed.

The opening within which the latch pin 121 is mounted extends to the lower face of the block 93 and the lower end of the pin is arranged to be engaged by a trip pin 130 carried by a lug 131 on the lower stop collar 14. This trip pin is adapted to be moved into and out of operative position and is held in one position or another by a small pin 132 which extends transversely through the trip 130 and is arranged to engage either with deep notches 133 or with shallow notches 134 formed in the upper end of the lug 131. When the trip 130 is in the position shown, with the cross-pin 132 engaging the shallow notches, the trip, at the end of the upper or return stroke, will enter the opening in the block 93 and engage and release the trip pin 121 so that shifter 105 will be actuated by the spring 106 to engage the clutch member through the medium of the shift lever 68. This shift of the lever 68 is effected against the pressure of the clutch disengaging pin 98, the actuating spring for which is much weaker than the spring 106 which actuates the clutch engaging shifter 105.

As already noted, the feed of the spindle may be effected by hand or by power under hand control through the medium of the clutch shift lever 68. When the clutch member is operatively engaged, it is locked in its position by the engagement of the latch 95 with the outer end of the lever 68. The operator can release the latch at any desired point by rotating the shaft 114 by means of the handle 120 to thereby rotate the pinion 116 and depress the plunger 100, so that the pin 101 engages the inner end of and releases the latch 95. This movement of the shaft will also retract the spring-actuated shifting plunger 105, so that when the latch is released the clutch member will be readily disengaged by the spring-actuated pin 98. The clutch teeth are so shaped that when the latch is tripped, they tend to force the clutch member to disengaged position, but preferably a spring-actuated shifter, such as the pin 98, is also employed to insure the complete disengagement of the clutch member.

If full automatic control of the clutch is desired, the trip 130 is placed in working position and the trip 103 is adjusted to give the desired working stroke. The clutch is then engaged and is held in engaged position by the latch 95. Near the end of the working stroke, trip 103 engages the plunger 100 and depresses the latter and retracts the shifting plunger 105, as described, from the position shown in Fig. 7 to that shown in Fig. 8, so that the shoulder 128 thereof is moved beyond the shoulder 129 of the latch pin 121. The further downward movement of the plunger 100 then brings the pin 101 thereon into engagement with the inner end of the latch to thereby lift and release its outer end to permit the disengagement of the clutch member. The return movement of the spindle and spindle sleeve is then effected by counter-balancing weight 17. As the spindle commences its return movement and moves the trip 103 away from the plunger 100, the latter is shifted upwardly and shifting plunger 105 outwardly by the spring 106 until the shoulder 128 engages the shoulder 129 of the latch pin, as shown in Fig. 8. At the end of the return stroke the trip 130 engages the lower end of the latch pin 121 and releases it so that the shifting plunger 105 is then actuated by the spring 106 to again engage the clutch and move the clutch lever into reëngagement with the latch 95 to thereby hold the clutch engaged until the end of the next working stroke.

A semi-automatic feed of the spindle can be effected by adjusting the upper trip 103 to working position and the lower trip to a non-working position. Under such circumstances, the latch pin 121 remains in the position shown in Fig. 8, so that the plunger 105 cannot move outwardly beyond the position shown in Fig. 8. The latch 95 will, however, be automatically tripped at the end of the working stroke, as previously described, to permit the return movement of the drill spindle. When full or semi-automatic feed control is employed, the slide 26 is so adjusted on the lever arms 19 that the counter-balancing weight will effect the return strokes of the drill spindle. To cushion this return stroke, the lower stop collar (see Fig. 3) is provided with a pin 135 which is adjustably threaded therethrough and which is arranged in line with a plunger 136 arranged within a vertical socket formed in the outer portion of the head 10. A spring 137 interposed between the headed end of the plunger and a plug 138 threaded in the upper end of the socket normally holds the plunger depressed with its head in engagement with a shoulder 139 at the lower portion of the socket. At the end of the return stroke, pin 135 strikes the spring-held plunger 136 to cushion the return stroke. The amount of cushioning effect can be varied, as desired, by adjusting the pin 135.

When either the full or semi-automatic feed control is employed, the operator can release the latch 95 and retract the shifting plunger 105 by means of the handle 120 at any point of the working stroke. Similarly, at any point of the return stroke the operator can engage the clutch by moving the clutch lever 68 into engagement with the latch 95. In this way the automatic feed is under full control of the operator. Furthermore, the operator may, if desired, at any time during the working stroke grasp the cross member 21 at the outer ends of the lever arm 19 and move the drill spindle downwardly to bring the tool quickly in engagement with the work. This movement is permitted by reason of the one-way connection between the clutch ratchet 59 and the driving worm-wheel 61.

It should also be noted that the automatic trips carried by the spindle do not directly actuate the clutch shift lever 68. The upper trip 103, through the medium of the plunger 100, releases the latch 95 to permit the disengagement of the clutch and also, as described, retracts the spring-actuated shifter 105. The lower trip 103 serves to release the trip-pin 121 to thereby permit the operation of the spring-actuated shifter 105 to effect the engagement of the clutch. By reason of this arrangement, the engagement and disengagement of the clutch member is effected with certainty and accuracy at the beginning and end of the working stroke.

Obviously, changes may be made in the details set forth without departure from the essentials of the invention as defined in the claims.

I claim as my invention:

1. In a drilling machine, the combination with the drill spindle and guiding head therefor, of power actuated feed mechanism for effecting the working stroke of said spindle, a controlling clutch for said feed mechanism, a shifter actuated by a spring to engage said clutch, latches for respectively holding said clutch engaged and said shifter retracted, and trips connected to said spindle for retracting said shifter independently of said clutch and for tripping said latches.

2. In a drilling machine, the combination with the drill spindle and guiding head therefor, of power actuated feed mechanism for effecting the working stroke of said spindle, a controlling clutch for said feed mechanism, a shifter having a lost motion connection with said clutch and spring actuated to engage the same, separate latches for respectively holding said clutch engaged and said shifter retracted, trips connected to said spindle for retracting said shifter and releasing said latches to thereby automatically effect the shift of said clutch, and manually operable means for effecting the engagement and disengagement of said clutch independently of said trips.

3. In a drilling machine, the combination with the drill spindle, spindle sleeve and guiding head, of feed mechanism and a counter-balance for effecting the working and return strokes respectively of said spindle, a controlling clutch for said feed mechanism, a shifter having a lost motion connection with said clutch and spring actuated to engage the same, a latch for holding said clutch engaged, a detent for holding said shifter retracted, trips on said spindle sleeve for retracting said shifter and for releasing said latch and said detent at the end and beginning respectively of the working stroke of the spindle, said latch-releasing trip being adjustable to vary the working stroke, and said detent-releasing trip being shiftable into and out of working position, and means for manually engaging said clutch.

4. In a drilling machine, the combination with the drill spindle, spindle sleeve and guiding head, of feed mechanism and a counter-balance for effecting the working and return strokes respectively of said spindle, a controlling clutch for said feed mechanism, a shifter having a lost motion connection with said clutch and spring actuated to engage the same, a latch for holding said clutch engaged, a detent for holding said shifter retracted, and upper and lower trips on said spindle sleeve for retracting said shifter independently of said clutch and for releasing said latch and said detent at the ends of the working and return strokes respectively of said spindle.

5. In a drilling machine, the combination with the drill spindle, a spindle sleeve and guiding head, of feed mechanism and a counter-balance for effecting the working and return strokes respectively of said spindle, a controlling clutch for said feed mechanism, a spring-actuated shifter for engaging said clutch, a latch for holding said clutch engaged, a detent for holding said shifter retracted, upper and lower trips on said spindle sleeve for retracting said shifter and for releasing said latch and said detent at the ends of the working and return strokes respectively of said spindle, said trips being adjustable into and out of working position and to vary the working stroke of the spindle, a manually operable shifter for releasing said latch and retracting said spring-actuated shifter and a manually operable shifter for engaging said clutch.

6. In a drilling machine, the combination with the drill spindle, spindle sleeve and guiding head, of feed mechanism and a counter-balance for effecting the working and return strokes respectively of said spindle, a controlling clutch for said feed mechanism, a spring-actuated shifter for engaging said clutch, a latch for holding said clutch engaged, a detent for holding said shifter retracted, trips on said sleeve for retracting said shifter and for releasing said latch and said detent and thereby automatically effect the engagement and disengagement of said clutch at the beginning and end respectively of the working stroke of the spindle, said trips being shiftable into and out of working positions, and manually operable shifters for effecting the shift of said clutch independently of said trips.

7. In a drilling machine, the combination with the spindle, spindle sleeve, and guiding head, of a feed shaft journaled in said head and geared to said spindle, drive gearing for said shaft mounted on said head, a clutch for controlling said gearing, an operating lever for said clutch, a spring-actuated shifter for throwing said lever to engage said clutch, a latch coöperating with said lever to hold said clutch engaged, a detent for holding said shifter retracted, a trip on said sleeve for retracting said shifter and releasing said latch, a second trip on said sleeve for releasing said detent, and a manually operable member for retracting said shifter and releasing said latch, said lever being manually operable to engage said clutch independently of said shifter.

8. In a drilling machine, the combination with the drill spindle, sleeve and guiding head, of power actuated feed mechanism mounted on said head and geared to said spindle for effecting the working stroke of said spindle, a controlling clutch for said feed mechanism, a device having a lost motion connection with said clutch and spring actuated to engage the same, coöperating latch mechanism for holding said clutch and said spring device in operative and in inoperative position, and trips on said sleeve for automatically controlling the operation of said spring device and latch mechanism at the beginning and end of the working stroke of the spindle.

9. In a drilling machine, the combination with the drill spindle, sleeve and guiding head, of power actuated feed mechanism mounted on said head and geared to said spindle for effecting the working stroke of said spindle, a controlling clutch for said feed mechanism, a device having a lost motion connection with said clutch and spring actuated to engage the same, coöperating latch mechanism for holding said clutch and spring device in operative and in inoperative position, and trips on said sleeve for controlling said spring device and latch mechanism to thereby automatically effect the engagement and disengagement of said clutch, the trip controlling the disengagement of the clutch being adjustable to vary the working stroke, and the other trip being shiftable into and out of working position, and means for manually engaging said clutch.

10. In a drilling machine, the combination with the drill spindle, sleeve and guiding head, of power actuated feed mechanism mounted on said head and geared to said spindle for effecting the working stroke of said spindle, a controlling clutch for said feed mechanism, a device having a lost motion connection with said clutch and spring actuated to engage the same, coöperating spring and latch mechanism for holding said clutch and spring device in operative and in inoperative position, trips on said sleeve for controlling said spring device and latch mechanism to thereby automatically effect the engagement and disengagement of said clutch, said trips being independently adjustable into and out of working position, and means for manually effecting the engagement and disengagement of said clutch independently of said trips.

11. In a drilling machine, the combination with the drill spindle, sleeve and guiding head, of power actuated feed mechanism mounted on said head and geared to said spindle for effecting the working stroke of said spindle, a controlling clutch for said feed mechanism, oppositely acting springs for substantially instantaneously engaging and disengaging said clutch, coöperating latches for holding said clutch engaged and said clutch engaging spring inoperative, and trips on said sleeve for releasing said latches to thereby automatically effect the engagement and disengagement of said clutch.

12. In a drilling machine, the combination with the drill spindle, sleeve and guiding head, of power actuated feed mechanism mounted on said head and geared to said spindle for effecting the working stroke of said spindle, a controlling clutch for said feed mechanism, oppositely acting springs for substantially instantaneously engaging and disengaging said clutch, coöperating latches for holding said clutch engaged and said clutch engaging spring inoperative, trips on said sleeve for releasing said latches to thereby automatically effect the shift of said clutch and manually operable means for engaging and disengaging said clutch independently of said trips.

13. In a drilling machine, the combination with the drill spindle, spindle sleeve and guiding head, of power-actuated feed mechanism for said spindle, a controlling clutch for said feed mechanism, a latch for positively locking said clutch in engagement, trips connected to said spindle, one arranged to engage and release said latch, and means controlled by the other trip for positively engaging said clutch.

14. In a drilling machine, the combination with the drill spindle, spindle sleeve and guiding head, of power-actuated feed mechanism for said spindle, a controlling clutch for said feed mechanism, a latch for positively locking said clutch in engagement, trips connected to said spindle, one arranged to engage and release said latch, and means controlled by the other trip for positively engaging said clutch, said trips being adjustable into and out of working position, and said latch and clutch being manually operable independently of said trips.

15. In a drilling machine, the combination with the drill spindle, spindle sleeve and guiding head, of power-actuated feed mechanism for said spindle, a controlling clutch for said feed mechanism, a lever for shifting said clutch, a spring device and a latch coöperating with said lever for respectively disengaging said clutch and for holding the same engaged, a trip on said sleeve for disengaging said latch, said trip being adjustable to vary the working stroke of said spindle, a second trip on said sleeve and a member controlled thereby for shifting said lever to engage said clutch, the latter trip being shiftable into and out of working position and said lever being manually operable to engage said clutch independently of said member.

16. In a drilling machine, the combination with the drill spindle, supporting spindle sleeve and guiding head, of feed mechanism mounted on said head and geared to said spindle, a power driven member for actuating said feed mechanism, a clutch for controlling said feed mechanism, and two rotary members having a pawl and ratchet connection interposed in said feed mechanism to permit the movement of said sleeve and spindle in working direction independently of said power driven member and without disengaging said clutch.

17. In a drilling machine, the combination with the frame, vertical drill spindle, supporting spindle sleeve, and guiding head, of a feed shaft geared to said spindle, drive gearing for said shaft mounted on said head, a controlling clutch and two rotary members having a pawl and ratchet connection interposed in said drive gearing, a counter-shaft for actuating said gearing, trips on said sleeve, and means controlled thereby for shifting said clutch.

18. In a drilling machine, the combination with the frame, vertical drill spindle, supporting spindle sleeve, and guiding head, of a horizontal feed shaft mounted on said head and geared to said spindle, a worm wheel and a ratchet wheel loosely mounted on said shaft, pawls on said worm wheel for engaging said ratchet, a shiftable clutch member on said shaft for connecting said ratchet wheel thereto, a vertical counter-shaft, a worm thereon engaging said worm wheel, and driving connections between said counter-shaft and said spindle.

19. In a drilling machine, the combination with the spindle, sleeve and adjustable guiding head, of clutch controlled feed mechanism mounted on said head for effecting the working stroke of said spindle, two rotary members having a pawl and ratchet connection interposed in said feed mechanism, and a lever arm connected to said head and to said sleeve and having a handle at its forward end in front of said sleeve.

20. In a drilling machine, the combination with the spindle, sleeve and adjustable guiding head, of clutch controlled feed mechanism mounted on said head for effecting the working stroke of said spindle, a lever arm connected to said head and said sleeve and extending in front of the latter, a slide block on said arm, a counterbalance connected to said slide block for effecting the return stroke of said spindle, and an adjusting screw for said slide block mounted on said lever and having a turnbutton on its forward end adjacent the forward end of said lever.

21. In a drill press, the combination with the spindle, spindle sleeve and adjustable guiding head, of clutch controlled feed mechanism mounted on said head for effecting the working stroke of said spindle, coöperating trip devices on said sleeve and head for throwing said feed mechanism into and out of operation, a counter-balance for effecting the return movement of said spindle, and coöperating stop devices on said head and sleeve for arresting the return movement of the spindle, one of said stop devices being adjustable, and the other spring-held in normal position.

22. In a drilling machine, the combination with a drill spindle and guiding head therefor, of power actuated feed mechanism for effecting the working stroke of said spindle, controlling clutch members for said feed mechanism, a shifter spring actuated to engage said clutch, and trips connected to said spindle and arranged to retract said shifter independently of said clutch to store power in its actuating spring at the end of the working stroke and to release said shifter for operation at the end of the return stroke.

23. In a drilling machine, the combination with a drill spindle and guiding head therefor, of power actuated feed mechanism for effecting the working stroke of said spindle, controlling clutch members for said feed mechanism, means for effecting the return stroke of said spindle, a spring actuated shifter for engaging said clutch members, a latch for positively locking said clutch members in engagement, a detent for holding said shifter retracted with power stored in its actuating spring, and trips connected to said spindle for retracting said shifter independently of said clutch and for releasing said latches at the ends of the working and return strokes respectively of said spindle.

24. In a drilling machine, the combination with a drill spindle and guiding head therefor, of power actuated feed mechanism for effecting the working stroke of said spindle, coöperating clutch members for controlling said feed mechanism, said clutch members having beveled faced teeth tending to disengage the same, a latch for positively locking said clutch members in engagement, a trip connected to said spindle for releasing said latch, a second trip connected with said spindle, and means controlled thereby for engaging said clutch members.

JAMES F. MIRRIELEES.